Jan. 4, 1944.   S. G. KELLER   2,338,586
METHOD OF HANDLING CATALYSTS
Filed Sept. 21, 1940
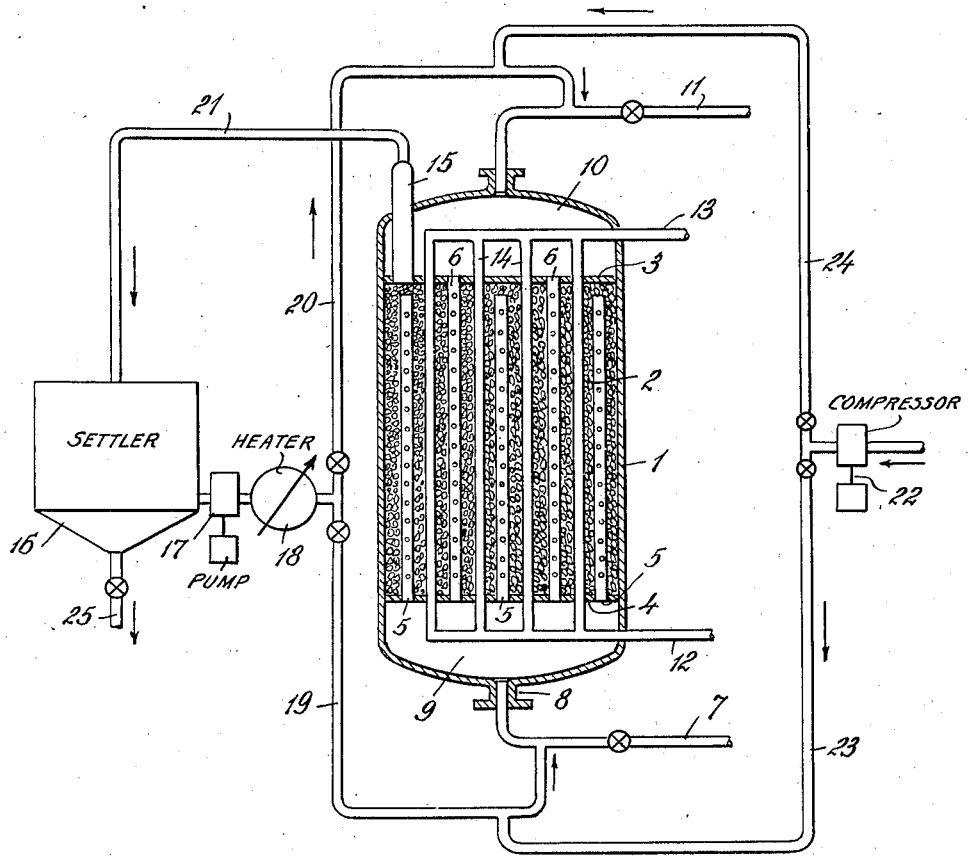

Patented Jan. 4, 1944

2,338,586

UNITED STATES PATENT OFFICE 2,338,586

METHOD OF HANDLING CATALYSTS

Samuel G. Keller, Dearborn, Mich., assignor to Socony-Vacuum Oil Company, Incorporated, New York, N. Y., a corporation of New York Application September 21, 1940, Serial No. 358,253

3 Claims. (Cl. 141—1)

This invention has to do with the handling of catalytic contact masses, and particularly with the removal of such contact masses from the apparatus in which they are housed, when, after numerous regenerations in place, their efficiency is so impaired as to necessitate a change of contact mass.

Many catalytic processes, of which the vapor phase catalytic conversion of hydrocarbon oils to gasoline, as set forth in the several patents of E. J. Houdry and associates, is typical, utilize quite extensive contact masses composed of particles partaking of the nature of an association of alumina and silica. One such catalyst is set forth in U. S. Patent 2,078,945 to E. J. Houdry. Other catalyst for similar and even for diverse uses consist of a base of a similar clayey material carrying added substance of catalytic capabilities. Many natural materials such as fuller's earth and bauxite are similarly used. Such contact masses may be accurately described as contact masses of clay type. Most of the uses are "in situ" uses, where the contact mass is housed in an apparatus wherein use of catalyst and regeneration of catalyst alternate until for one reason or another the catalyst must be removed. Usually either the reaction or the regeneration require extensive heat control, and there is embedded in the contact mass an extensive structure of heat exchange tubes as shown in U. S. Patent 2,161,676 to Houdry or U. S. Patent 2,209,040 to Simpson et al., which indicate diagrammatically structures which are much more complicated in commercial practice.

While these contact masses are composed of pellets or particles, and which masses in normal condition flow readily, somewhat as would sand or gravel, a degraded catalyst is frequently a different matter, and its removal without extensive dismantling of the catalyst case becomes difficult.

The principal object of this invention is the provision of a method whereby spent or degraded catalysts of this kind may be readily reduced to a semi-liquid or slurry and easily removed from the catalyst case without dismantling or extensively opening the same.

The invention is based upon the discovery that such catalysts may be disintegrated by boiling with alkaline solutions.

The invention may be further explained by reference to the drawing attached hereto, which shows in diagram form the process and its application. In this drawing 1 represents a catalyst chamber, in which a contact mass 2 is confined between tube sheets 3 and 4. Tubes 5 extend upward from tube sheet 4 into the contact mass, and are closed on their upper ends and are provided with orifices in their side walls. Tubes 6 extend downwardly from tube sheet 3, are closed at their lower ends, and are provided with orifices in their sidewalls. During the normal reaction operation of the case, reactants provided by pipe 7 enter case 1 through fitting 8, utilizing chamber 9 as a manifold are distributed among tubes 5, pass through the orifices in tubes 5 to enter the contact mass, depart from the contact mass into tubes 6 through the orifice therein, from tubes 6 pass to chamber 10 and depart through pipe 11. Regeneration agents follow the same path during regeneration. Heat control during operation is effected by a fluid heat control medium circulated between pipes 12 and 13 through tubes 14 embedded in contact mass 12. Initial placing of the contact mass is effected through a plurality of catalyst loading nozzles extending through tube sheet 3 and the upper head of chamber 1. Only one of these, 15, is here shown for simplicity.

In order to remove spent catalyst contact mass from this chamber I make use of a strong caustic soda solution stored in settler 16, forcing it by pump 17 through heater 18, and alternately through pipes 19 or 20 into pipes 7 or 11, whence it passes either through tubes 5 or 6 and into the contact mass, departing from chamber 1 through one or more catalyst loading nozzles 15 and is returned by pipe 21 to settler 16. Simultaneously, I compress air with compressor 22 and force said air through pipes 23 and 24 into pipes 7 and 11, the purpose of this air being both to effect an agitation of the caustic solution bathing the contact mass and to prevent clogging of the orifices in tubes 5 and 6. Caustic solution collected in settler 16 is settled and the settled slimes, etc., are discarded through pipe 25, while the cleared solution is recirculated to use.

The alkali solution may be either sodium hydroxide or potassium hydroxide, the sodium hydroxide being preferable upon several grounds besides that of being less costly. A solution of any usual commercial strength may be used although one of about 20° Bé. appears to give better balance between rate and amount of solution handled and has other advantages.

The caustic solution should be heated to between about 150° F. and 180° F. prior to entry to the contact mass. The degree of heating is somewhat dependent upon the prior history of the contact mass particles, those having been subjected to higher temperatures requiring the higher digestion temperatures. However, a temperature of about 160° F. appears quite adequate for contact mass materials which have been subjected to 1500° F., which is about 400° F. higher than most such materials will ordinarily be subjected to in practice.

Approximately one pound of sodium hydroxide is needed for one pound of a contact mass consisting substantially of alumina and silica. The caustic reacts with the alumina and silica, bringing these into solution. Any other material in the catalyst, such as metal additives, may be removed suspended in the solution. Obviously the method is not only applicable to contact mass particles consisting essentially of alumina and silica, but also to any contact mass particle employing as a base or carrier anything of a clay like nature, either natural or synthetic in origin, as well as to natural materials as fuller's earth and bauxite. Such contact mass particles may be typified as those comprising alumina or an association of alumina and silica.

Certain materials, such as for example calcium or iron which may be present in small amounts in the contact mass appear to form a slime rather than a solution and for this reason the settling tank 16 is interposed, so that these may be settled and removed, the clearer portion of the solution being returned for further treatment.

This method of removal will have little if any effect upon the usual construction materials used in catalyst case construction, particularly if the removal is followed by thorough flushing and by a wash with a weak acid, such as acetic acid.

I claim:

1. That method of cleaning a large reaction vessel of complex internal structure substantially filled with degenerated clay or like material, which vessel includes a plurality of perforated conduits extending throughout the clay occupied zone, which comprises supplying a heated aqueous solution of a strong alkali through said conduits and the perforations therein to the clay occupied zone, resolving the clay material into a flowable condition and removing it marginally of the clay occupied zone through relatively large outlets distinct from any of said conduits.

2. That method of cleaning a large reaction vessel of complex internal structure substantially filled with clay or like material, which vessel includes a plurality of perforated conduits for distributing material throughout the clay zone thereof and another plurality of perforated conduits for withdrawing material from the clay zone after lateral flow therethrough, which comprises alternately supplying a heated aqueous solution of a strong alkali through said distributing and withdrawing conduits, resolving the clay material into a flowable condition and removing it from the clay occupied zone independently of any of said conduits whereby the solution of strong alkali is distributed throughout the clay zone of the reaction vessel and the conduit perforations are cleaned.

3. That method of cleaning a large reaction vessel of complex internal structure substantially filled with clay or like material, which vessel includes a plurality of perforated conduits for distributing material throughout the clay zone thereof and another plurality of perforated conduits for withdrawing material from the clay zone after lateral flow therethrough, which comprises alternately supplying an aqueous caustic soda solution of 10 to 20° Bé. strength at a temperature from about 150° F. to 180° F. through said distributing and withdrawing conduits, resolving the clay material into a flowable condition and removing it from the clay occupied zone independently of any of said conduits whereby the caustic soda solution is distributed throughout the clay zone of the reaction vessel and the conduit perforations are cleaned.

SAMUEL G. KELLER.